I. A. GREEN.
STRAINER HOLDER.
APPLICATION FILED JUNE 5, 1915.
1,264,917.
Patented May 7, 1918.
2 SHEETS—SHEET 2.
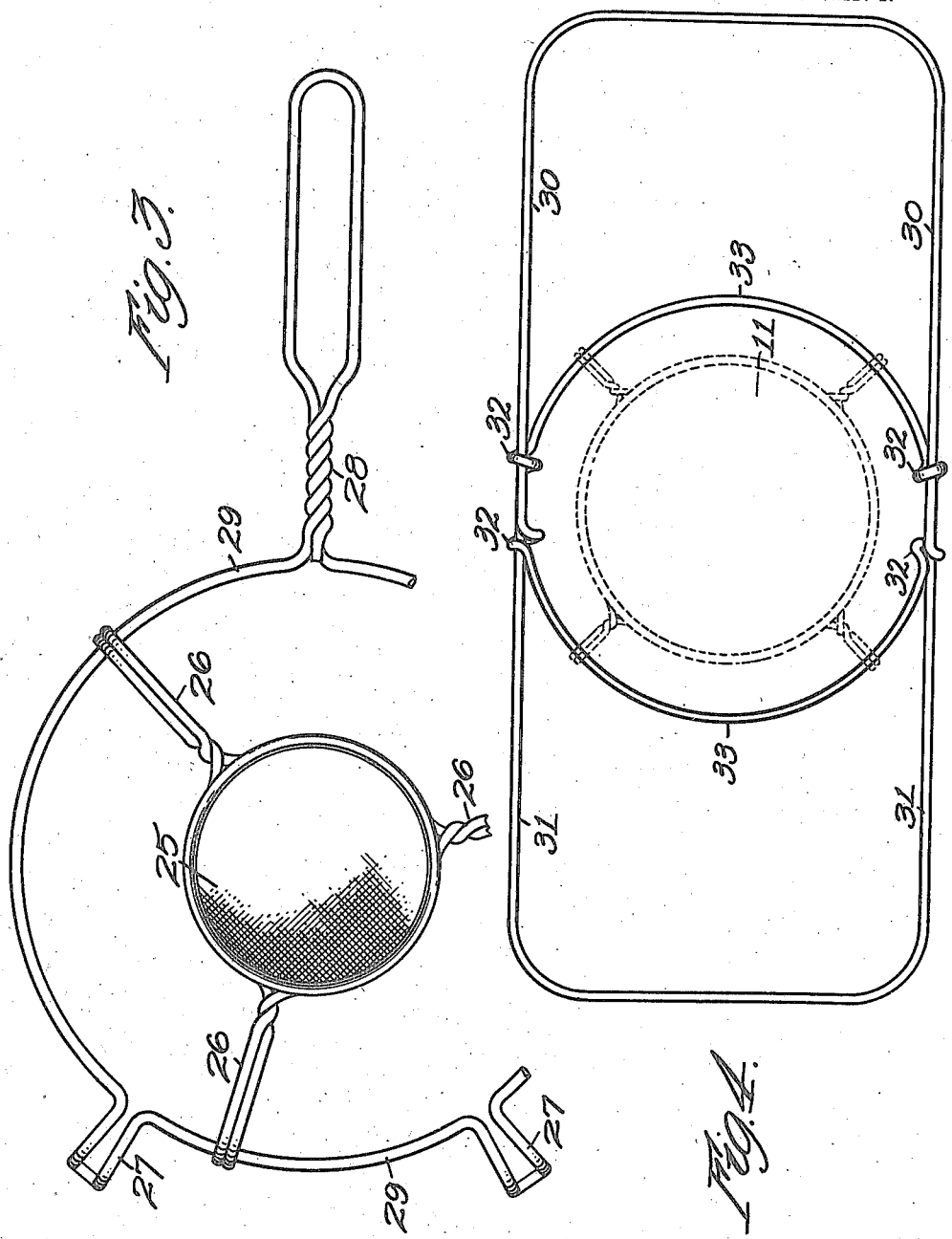
Witness
C. F. Wesson
Inventor
Irving A. Green
by Attorneys
Southgate & Southgate

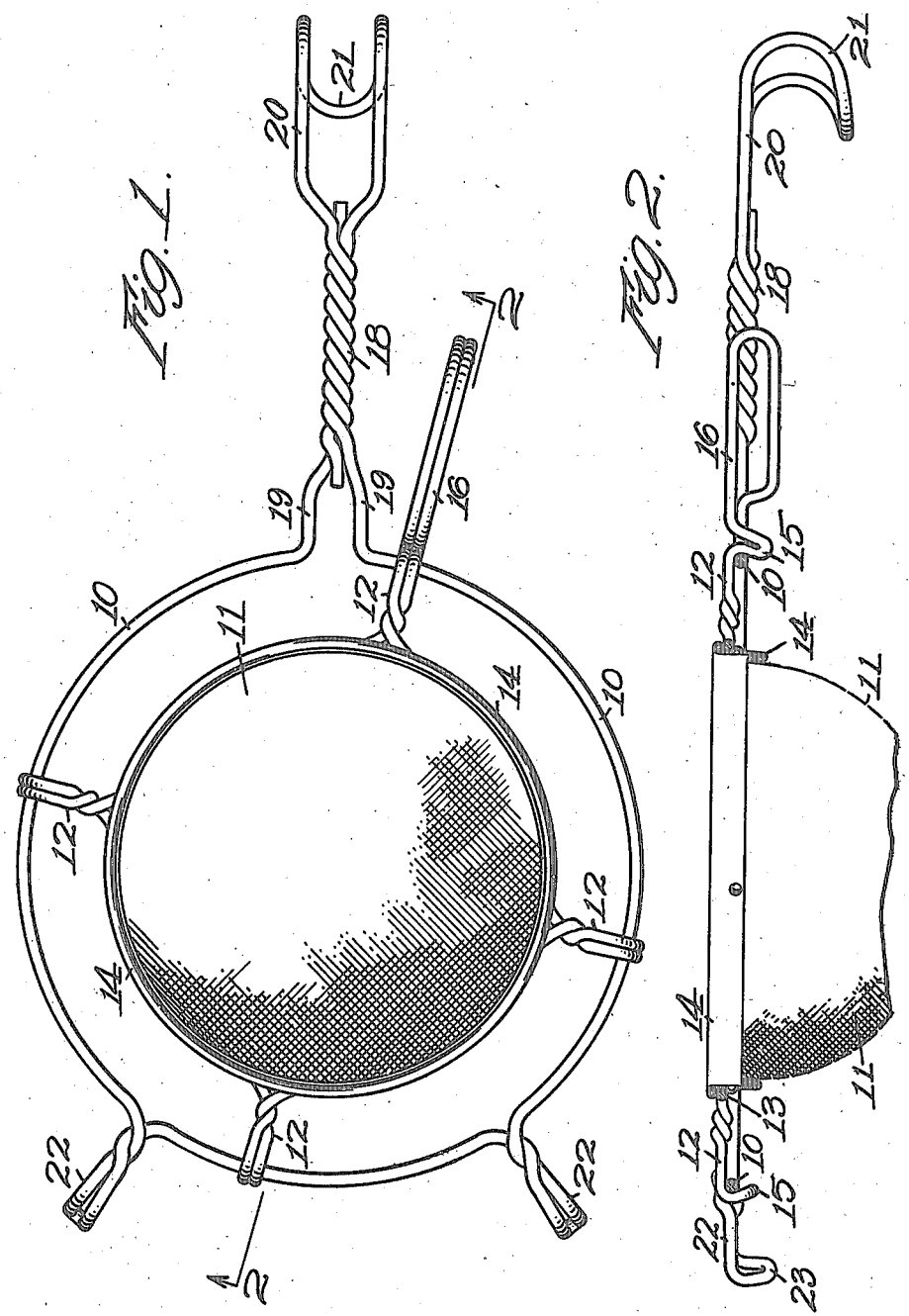

UNITED STATES PATENT OFFICE.

IRVING A. GREEN, OF WORCESTER, MASSACHUSETTS, ASSIGNOR TO WIRE GOODS COMPANY, A CORPORATION OF MASSACHUSETTS.

STRAINER-HOLDER.

1,264,917.　　　　　　　　Specification of Letters Patent.　　　　Patented May 7, 1918.

Application filed June 5, 1915. Serial No. 32,411.

*To all whom it may concern:*

Be it known that I, IRVING A. GREEN, a citizen of the United States, residing at Worcester, in the county of Worcester and State of Massachusetts, have invented a new and useful Strainer-Holder, of which the following is a specification.

This invention relates to a holder for strainers for kitchen use.

The principal objects of the invention are to provide a combined holder and strainer detachably connected so that when the strainer wears out or is injured in any way, it can be replaced by a new one without also replacing the holder which is necessarily of a more durable construction; to provide a construction in which a set of strainers of different sizes can be applied to the same holder at different times so as to adapt the holder for a number of different uses; to provide a construction of holder which, while of comparatively rigid construction so as to support a strainer effectively, yet is capable of yielding sufficiently to permit of ready attachment and detachment of the strainer; to provide improvements in the means for supporting the holder on a dish or the like and in the handle, whereby the handle serves for the purpose of handling the whole device with the strainer attached, and also is more effective than the ordinary handles as a hand grip; and to provide a utensil of the type above specified made of wire.

The invention also involves improvements in details of construction as will appear hereinafter.

Reference is to be had to the accompanying drawings, in which—

Figure 1 is a plan of a preferred embodiment of the invention;

Fig. 2 is a sectional view of the same on the line 2—2 of Fig. 1;

Fig. 3 is a plan of a construction somewhat modified and also showing a strainer of different size applied thereto to illustrate the interchangeability of the strainers; and Fig. 4 is a plan of another modification.

The invention, as shown in Figs. 1 and 2, is illustrated in the form of a circular holder 10 made of a single piece of wire bent into a circular form to furnish a support for the strainer 11. This strainer is shown in these figures as having four arms 12 extending outwardly therefrom, these arms being of wire and integral with a circular member 13 which surrounds the sheet metal rim 14 of the strainer. The arms are located in a plane, extending out radially and bent down at their ends so as to engage over the wire 10. Furthermore, they are bent inwardly slightly at 15, as shown in Fig. 2, so as firmly to grip the wire 10 and not be likely to be dislodged accidentally. One of these arms is provided with an extending handle 16 integral with the arm so that the strainer can be manipulated by this handle when removed from the holder. Furthermore, this handle is located adjacent to the handle 18 of the holder, preferably, and therefore the parts can be separated readily by pulling down on one and up on the other. This holder is shown as made of a single piece of wire.

The handle 18 is shown as connected with the body 10 of the holder by two legs 19 which are separated from each other for a considerable distance from the circular wire 10. This is for the purpose of permitting a certain amount of resiliency in the wire 10 so that the bent-under ends 15 of the arms 12 can be forced into position without permanently distorting the holder, and so that when this is done, the holder will spring out into normal shape and effectively hold the strainer and prevent its jarring loose or accidentally being disengaged from it. The handle is shown as formed integrally with the wire 10 and twisted together for strength and compactness, and at its outer end it is separated to form a hand hold 20 and then turned over to form a hook 21 which, when handling the device, is adapted to come around under the little finger and thus furnish a positive stop by which the whole device is prevented from being accidentally pulled out of the hand in use. This also makes the device more compact for packing purposes.

The holder is also shown in these figures as provided with two radial arms 22 integral with it and having a twist therein. These with the handle constitute a three point support. These arms are provided with bent ends 23 so that when the device is used on a large dish or other receptacle these bent ends serve as stops to prevent its slipping off the edge of the same.

An important feature of the invention also consists in the fact that the strainer 11 is readily detachable from the holder and consequently strainers of different sizes can be used on the same holder. In Fig. 3 another strainer 25 is shown of smaller size and having comparatively longer arms 26, shaped otherwise like the arms 12 so that it can be used with the same holder 10 if desired. Ordinarily in practice, strainers of three sizes are furnished to constitute a set, all of them being adapted to be used with the same holder. It will be observed, however that as each one has a handle it can be used separately without the holder. In the case of the strainer 25, each of the arms 26 is long enough to constitute a handle so no separate handle is shown.

In the form of the holder shown in Fig. 3, some other modifications are indicated, one consisting in making the arms 27, which take the place of the arms 22, open so that they thus furnish the resiliency which is furnished in Fig. 1 by the legs 19. In this case the handle 28 can be twisted up clear to the rim of the holder 29.

In the form shown in Fig. 4, a strainer in all respects like the strainer 11 is shown in dotted lines as applied to a telescoping frame formed of two parts 30 and 31, each constituting a handle for manipulating it. Each of these members is provided with an integral eye 32 on each side and the straight bar forming part of the member 30 or 31 passes through the eye 32 on the other member, thus constituting a telescoping frame. Furthermore, in addition to the parts of these frames which constitute the outside of this device, each frame is provided with an integral, continuous, semi-circular member 33. These two together constitute a complete circle when the parts are in the position shown in the figure. In this case the two members 33 constitute a substitute for the holder 10 and the outer portions which are integral with them constitute the supporting means. In this case the strainers, either individually or in sets, are detachably connected with the supporting frame and yet when the device is packed for shipping, it takes up very little room as it is all substantially in a plane. In this case, also, there is no need of any special resiliency of the parts, because when it is desired to loosen the supporting frame from the strainer, this can be done by forcing the semi-circular parts 33 nearer together.

It will be seen, therefore, that a device is produced which results in economy because the holder does not have to be thrown away whenever a strainer is rendered useless, and furthermore, a kitchen utensil is provided having a wide range of usefulness when three or more strainers are employed and yet costing comparatively little and taking up very little space for storage. The strainers also can be used separately without the holder whenever desired.

It is to be observed that on account of the arms on the strainer being at equal distances from the center thereof, or rather their projections 15 being so placed, and on account of the circular shape of the wire holder, the strainers can be put on in any angular position and the user does not need to take any pains to place the strainer at any particular angle on the holder.

Although I have illustrated and described only three forms of the invention, I am aware of the fact that many other modifications can be made therein by any person skilled in the art without departing from the scope of the invention as expressed in the claims. Therefore, I do not wish to be limited to all the details of construction herein shown and described, but What I do claim is:—

1. In a kitchen utensil, the combination of a holder consisting of a substantially circular resilient wire member provided with a radial handle, and means constituting with the handle a three-point support for the same, with a circular wire strainer frame adapted to be detachably connected with said holder at any angle thereon, said strainer frame having arms bent downwardly and inwardly at their ends to engage under the wire member and permit oscillation of the strainer on said wire member but prevent its removal without bending the arms, and having a radial handle projecting over said wire member and beyond it.

2. In a kitchen utensil, the combination of a holder consisting of a substantially circular skeleton wire member provided with a handle on one side, and means substantially opposite the handle constituting with the handle a support for the same, with a smaller circular wire strainer spaced inside said holder all around and concentric therewith and having radial arms extending therefrom and adapted to be detachably connected with said holder at any angle thereon, said arms being bent downwardly and inwardly at their ends to engage under the wire member and permit oscillation of the strainer thereon but prevent its removal without bending the arms, whereby the strainer can be replaced by another of different size but having arms bent down at the same distance from the center.

In testimony whereof I have hereunto set my hand, in the presence of two subscribing witnesses.

IRVING A. GREEN.

Witnesses:
BERTRAM D. TAITT,
EDGAR G. FERGUSON.